United States Patent [19]
Sato et al.

[11] Patent Number: 5,488,710
[45] Date of Patent: Jan. 30, 1996

[54] CACHE MEMORY AND DATA PROCESSOR INCLUDING INSTRUCTION LENGTH DECODING CIRCUITRY FOR SIMULTANEOUSLY DECODING A PLURALITY OF VARIABLE LENGTH INSTRUCTIONS

[75] Inventors: Taizo Sato; Atsushi Fujihira, both of Kawasaki, Japan

[73] Assignee: Fujitsu Limited

[21] Appl. No.: 833,412

[22] Filed: Feb. 10, 1992

[30] Foreign Application Priority Data

Feb. 8, 1991 [JP] Japan .................................. 3-016716
Feb. 13, 1991 [JP] Japan .................................. 3-019849

[51] Int. Cl.$^6$ ........................... G06F 12/04; G06F 13/00; G06F 9/30
[52] U.S. Cl. .......................... 395/452; 395/450; 395/375; 364/DIG. 1
[58] Field of Search ...................... 395/425, 375, 395/450, 452, 421.02

[56] References Cited

U.S. PATENT DOCUMENTS

| | | | |
|---|---|---|---|
| 3,077,580 | 2/1963 | Underwood | 395/425 |
| 4,530,050 | 7/1985 | Fukunaga et al. | 395/375 |
| 4,654,781 | 3/1987 | Schwartz et al. | 395/425 |
| 4,689,765 | 8/1987 | Hooper | 395/775 |
| 4,873,629 | 10/1989 | Harris et al. | 395/375 |
| 5,051,885 | 9/1991 | Yates, Jr. et al. | 395/375 |
| 5,202,967 | 4/1993 | Matsuzaki et al. | 395/375 |
| 5,233,696 | 8/1993 | Suzuki | 395/375 |
| 5,249,273 | 9/1993 | Yoshitake et al. | 395/375 |
| 5,293,592 | 3/1994 | Fu et al. | 395/375 |
| 5,295,249 | 3/1994 | Blaner et al. | 395/375 |

FOREIGN PATENT DOCUMENTS

| | | |
|---|---|---|
| 0052194 | 5/1982 | European Pat. Off. . |
| 2-103627 | 4/1990 | Japan . |
| 90/03001 | 3/1990 | WIPO . |

OTHER PUBLICATIONS

Tron Specification Chip–Architecture Overview, by Ken Sakamura Ver.1.00.00.00, 1991, pp. 1–10, 86–91 and title page.

*Primary Examiner*—Glenn Gossage
*Attorney, Agent, or Firm*—Staas & Halsey

[57] ABSTRACT

A cache memory, and a data processor including the cache memory, for processing at least one variable length instruction from a memory and outputting processed information to a control unit, such as a central processing unit (CPU). The cache memory includes a unit for decoding an instruction length of a variable length instruction from the memory, and a unit for storing the variable length instruction from the memory, together with the decoded instruction length information. The variable length instruction and the instruction length information thereof are fed to the control unit. Accordingly, the cache memory enables the control unit to simultaneously decode a plurality of variable length instructions and thus realize high speed processing.

14 Claims, 15 Drawing Sheets

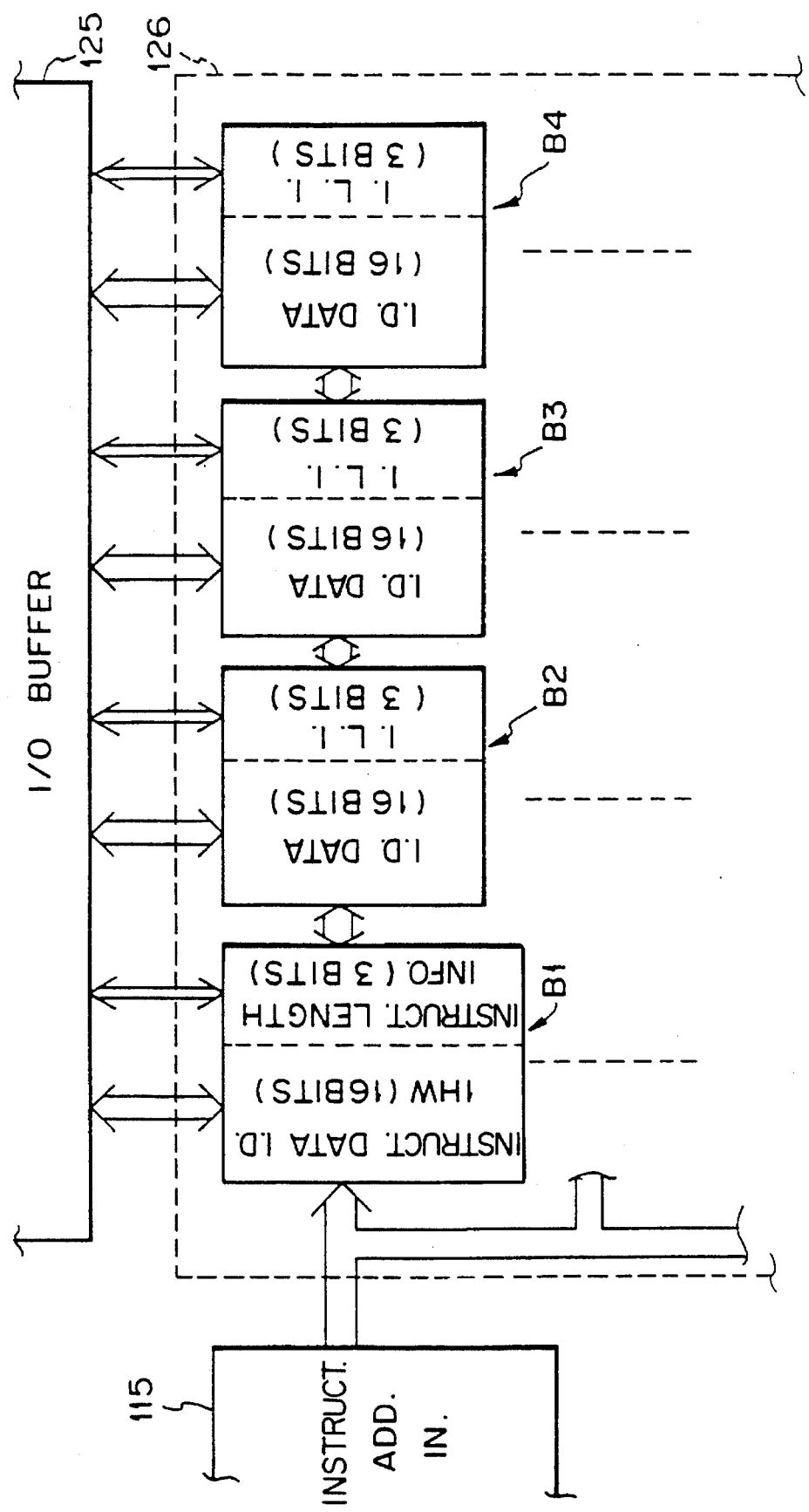

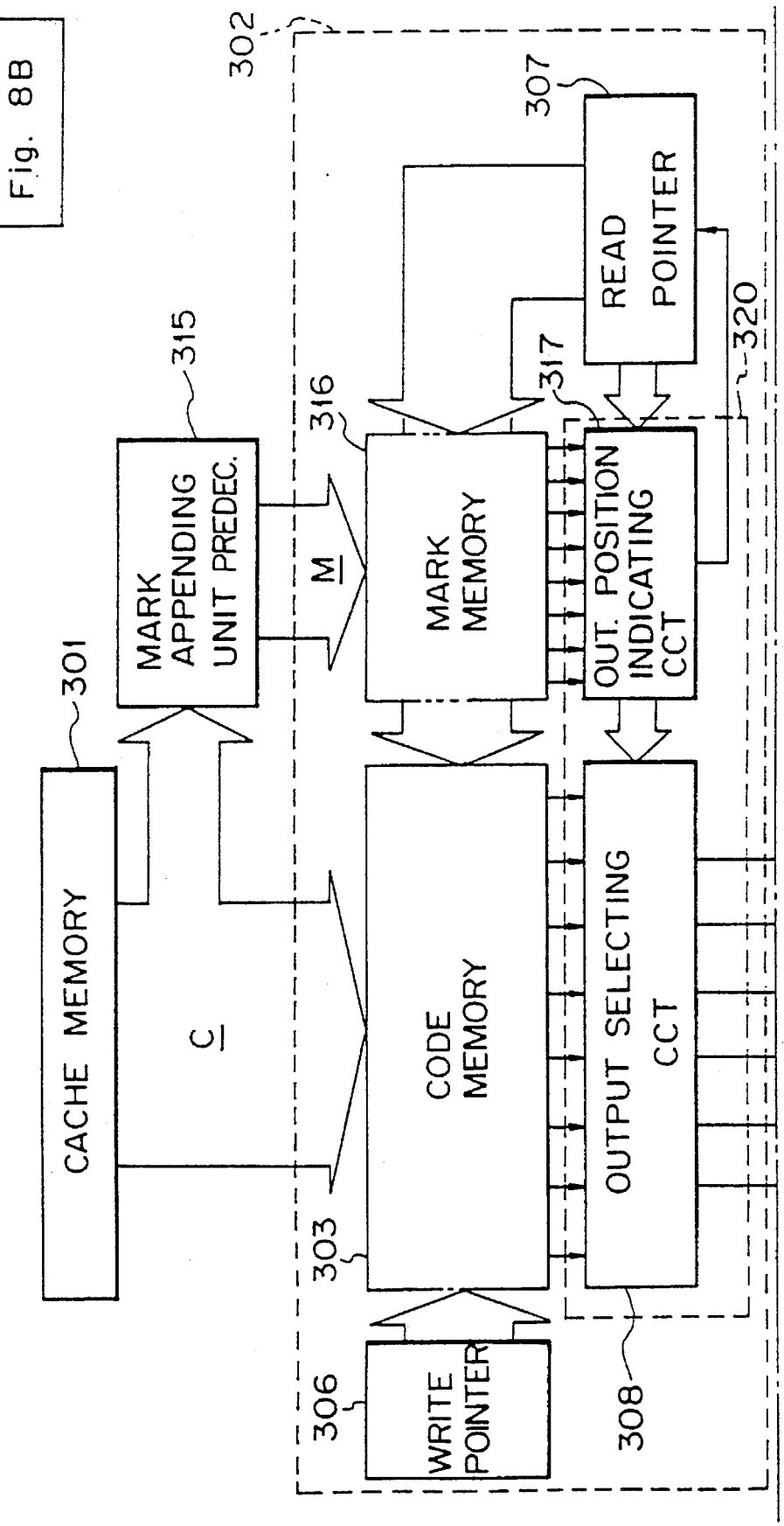

CACHE MEMORY AND DATA PROCESSOR INCLUDING INSTRUCTION LENGTH DECODING CIRCUITRY FOR SIMULTANEOUSLY DECODING A PLURALITY OF VARIABLE LENGTH INSTRUCTIONS

BACKGROUND OF THE INVENTION

1. Field of the Invention

The present invention relates to a cache memory connected between a central processing unit (CPU) executing high speed computing processing and a main memory effecting a relatively low speed operation in a computer. More particularly, it relates to a cache memory which processes instruction data from the main memory and thus can realize high speed decoding of the instruction data in the CPU.

2. Description of the Related Art

Recently, CPUs which execute a greater part of an instruction in one cycle have been developed. Nevertheless, they are required to execute high speed processing. To this end, cache memories provided for the respective CPUs are also required to effect high speed operation accordingly.

As one approach to realizing high speed computing processing, an idea of increasing a frequency of the operational clock has been proposed. This, however, is difficult to realize because a peripheral circuit, for example, constituted by transistor-transistor logic (TTL), cannot satisfactorily meet conditions required for the operational clock frequency. Accordingly, other approaches to realizing high speed processing without increasing the frequency of the operational clock have been demanded.

As an approach to meet the demand, a technique of simultaneously executing a plurality of instructions is known, which is roughly classified into two categories. One is the case that each instruction has a fixed length, and the other is the case that each instruction has a variable length. With respect to a data processor which processes a plurality of fixed length instructions, a position of a next instruction succeeding an instruction is fixed and, accordingly, it is possible to simultaneously execute the two neighboring instructions.

However, with respect to a data processor which processes a plurality of variable length instructions as is described in The Real Time Operating System Nucleus (TRON) Specification Chip Architecture Overview, a problem is posed. Namely, since the position of the succeeding instruction is changed or not fixed, it is impossible to simultaneously execute the two neighboring instructions so long as the position of the succeeding instruction is not specified by any means.

Thus, in a prior art data processor processing variable length instructions as in the TRON Specification, a problem occurs in that it is impossible to simultaneously execute a plurality of instructions and thus realize a high speed computing processing. In other words, to realize high speed processing, a cache memory connected between a CPU and a main memory must be improved with respect to the processing of instruction data from the main memory. To cope with this, various approaches are proposed; however, a known effective improvement has not been proposed.

The problems in the prior art will be explained later in detail in contrast with the preferred embodiments of the present invention.

SUMMARY OF THE INVENTION

An object of the present invention is to provide a cache memory adapted to enable a CPU to simultaneously decode a plurality of instructions even if they are variable length ones, and thus realize high speed processing.

According to the present invention, there is provided a cache memory for processing at least one variable length instruction from a memory and outputting processed information to a control unit, the cache memory including: an instruction length decoding unit for decoding an instruction length of the variable length instruction from the memory; and an instruction storing unit for storing the variable length instruction from the memory and corresponding instruction length information from the instruction length decoding unit, and outputting the variable length instruction and the instruction length information thereof to the control unit.

Also, according to the present invention, there is provided a cache memory for storing instruction data from a memory and outputting processed information to a control unit, the cache memory including: a unit for generating predecoded information as part of a decoding of the instruction data; a memory unit for storing the predecoded information together with the instruction data; a unit for checking a predecoded information output from the memory unit together with the instruction data in a cache hit state; a rewriting unit for, when the checked predecoded information proves to be invalid or wrong, correctly rewriting the predecoded information in the memory unit; and a control information outputting unit for, when the checked predecoded information proves to be invalid or wrong, outputting control information reflecting a result of the check of the precoded information to the control unit.

BRIEF DESCRIPTION OF THE DRAWINGS

Other objects and features of the present invention will be described hereinafter in detail by way of preferred embodiments with reference to the accompanying drawings, in which:

FIG. 7 is a block diagram schematically showing a more detailed construction of the data memory shown in FIG. 5;

FIGS. 8, 8A and 8B are block diagrams showing how the CPU can simultaneously process two instructions with or without extended parts;

FIGS. 9, 9A to 9C are block diagrams showing how the CPU can simultaneously process two instructions each having a variable length extended part;

DESCRIPTION OF THE PREFERRED EMBODIMENTS

Throughout the description, identical references used in connection with the drawings indicate like constituent elements and thus the repetition of explanation thereof is omitted.

A preferred embodiment according to the first aspect of the present invention will be explained with reference to FIGS. 1 to 9C.

First, for better understanding of the preferred embodiment, the related prior art will be explained with reference to FIGS. 1 to 3.

Figure 1:
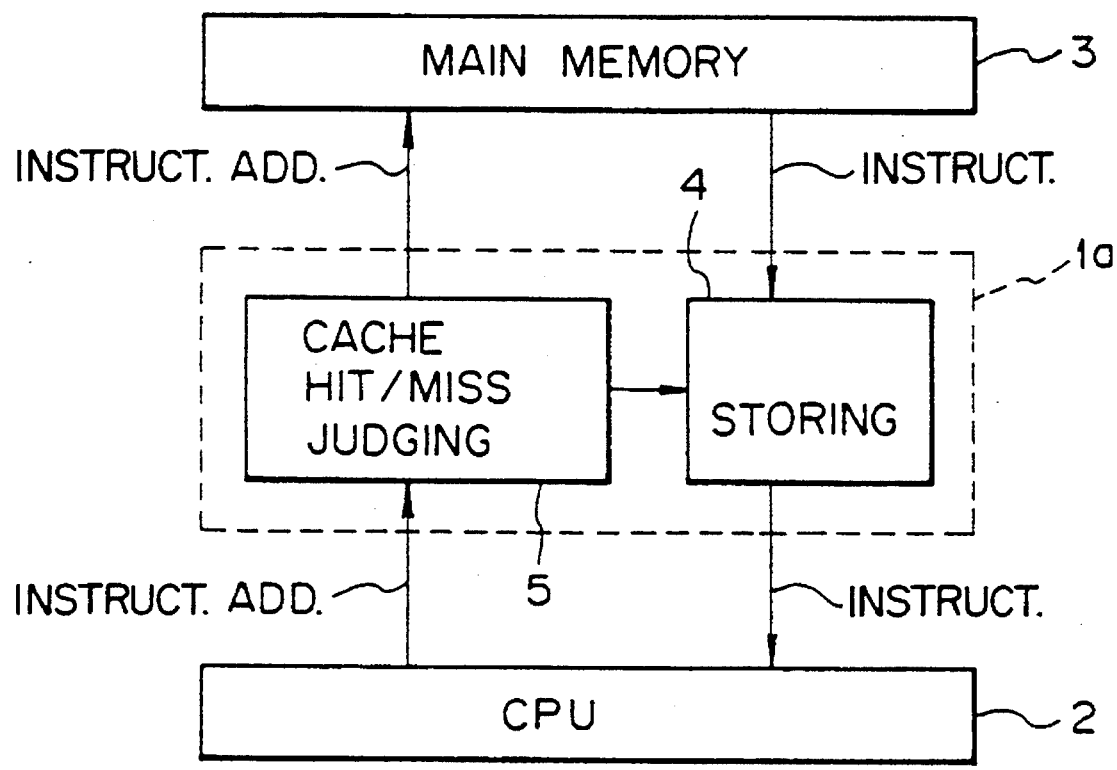
FIG. 1 is a block diagram showing a first prior art data processor using a cache memory.

FIG. 1 illustrates a constitution of a first prior art data processor using a cache memory.

In the illustration, 1a denotes a cache memory connected between a CPU 2 and a main memory 3 in the data processor. The cache memory 1a includes an instruction storing unit 4 for storing instructions from the main memory 3, and a cache hit/miss judging unit 5 for comparing an instruction address output from the CPU 2 with an address stored in the cache memory 1a and judging whether a cache "hit" state or a cache "miss" state exists.

In the data processor thus constituted, where the CPU 2 fetches an instruction, it first makes an address access to the cache memory 1a. Where the instruction to be fetched is present in the cache memory 1a (i.e., cache "hit" state), it is supplied to the CPU 2. On the other hand, where the instruction to be fetched is not present in the cache memory 1a (i.e., cache "miss" state), access is made to the main memory 3 and thus the corresponding instruction is read out. The instruction is supplied to the CPU 2 and stored in the instruction storing unit 4 of the cache memory 1a.

In the above constitution, it is assumed that the CPU 2 is constituted so as to process a plurality of instructions. Where each instruction has a fixed length, the position of an instruction succeeding a certain instruction is fixed and, accordingly, the CPU 2 can simultaneously execute the plurality of instructions.

Where each instruction has a variable length, however, the position of the succeeding instruction varies. Accordingly, so long as the position of the succeeding instruction is not specified by any means, the CPU 2 cannot simultaneously execute the plurality of instructions.

Figure 2:
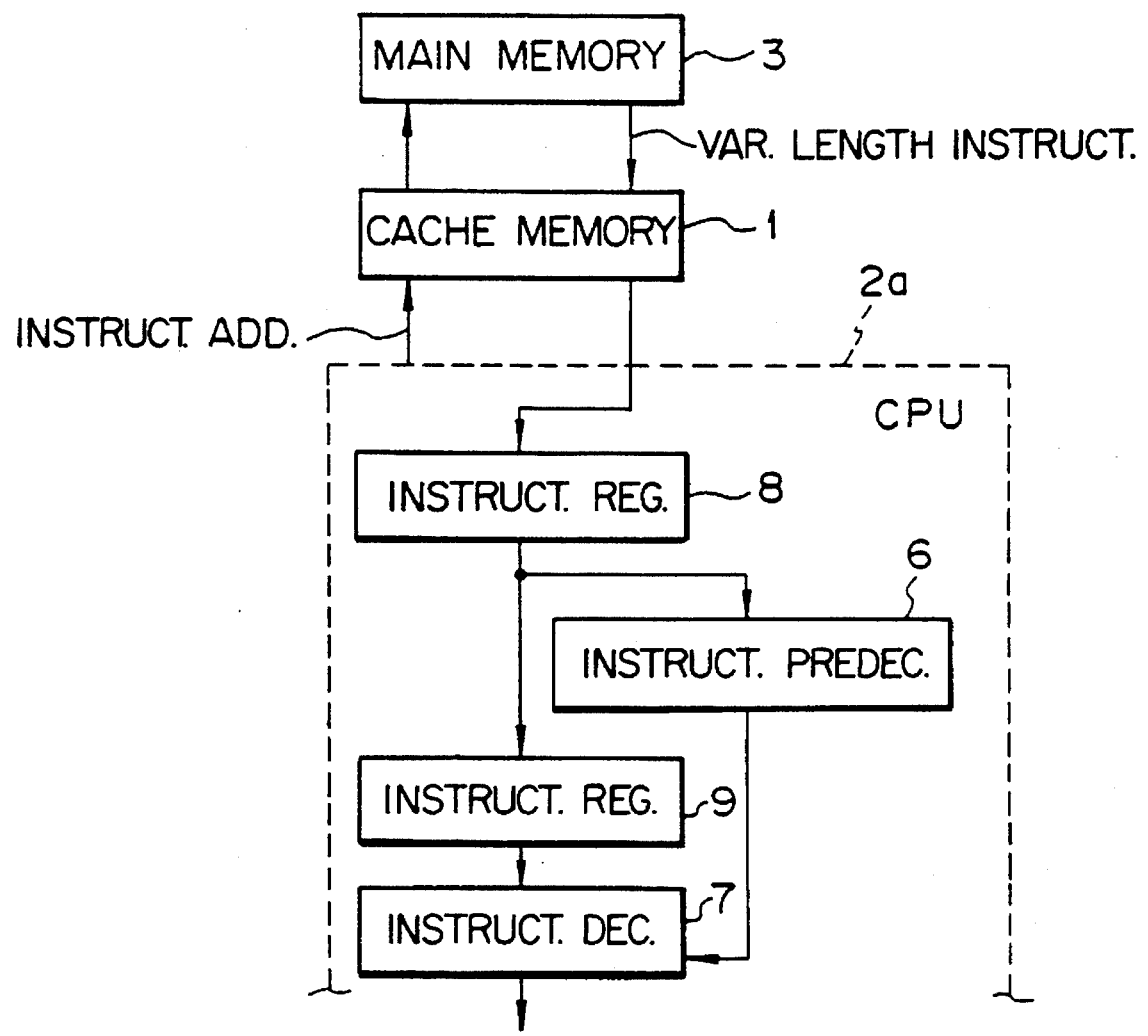
FIG. 2 is a block diagram showing a second prior art data processor using a cache memory.

FIG. 2 illustrates a constitution of a second prior art data processor using a cache memory.

The illustrated data processor is directed to a simultaneous execution of a plurality of variable length instructions and includes a cache memory 1 which receives and transmits instruction addresses and variable length instructions between a CPU 2a and the main memory 3. The CPU 2a includes an instruction register 8 for temporarily storing instruction data from the cache memory 1, an instruction predecoder 6 for predecoding the instruction data from the instruction register 8 to determine an instruction length thereof, an instruction register 9 for storing the instruction data from the instruction register 8 for a predetermined time (corresponding to the time required for the predecoding), and an instruction decoder 7 for decoding the instruction data from the instruction register 9 and the predecoded information (i.e., instruction length information) from the instruction predecoder 6.

According to this construction, it is possible to simultaneously supply the instruction decoder 7 with two instructions, using the instruction predecoder 6 and the instruction register 9, and thus effect a simultaneous execution of the two instructions.

The constitution, however, has a disadvantage in that it takes time to predecode the instruction data. Also, since the instruction data has a variable length, it is not easy for the instruction predecoder 6 to simultaneously predecode two variable length instructions. As a result, a problem occurs in that it is impossible to successively supply instructions to the instruction decoder 7 and thus the processing speed is lowered.

Figure 3:
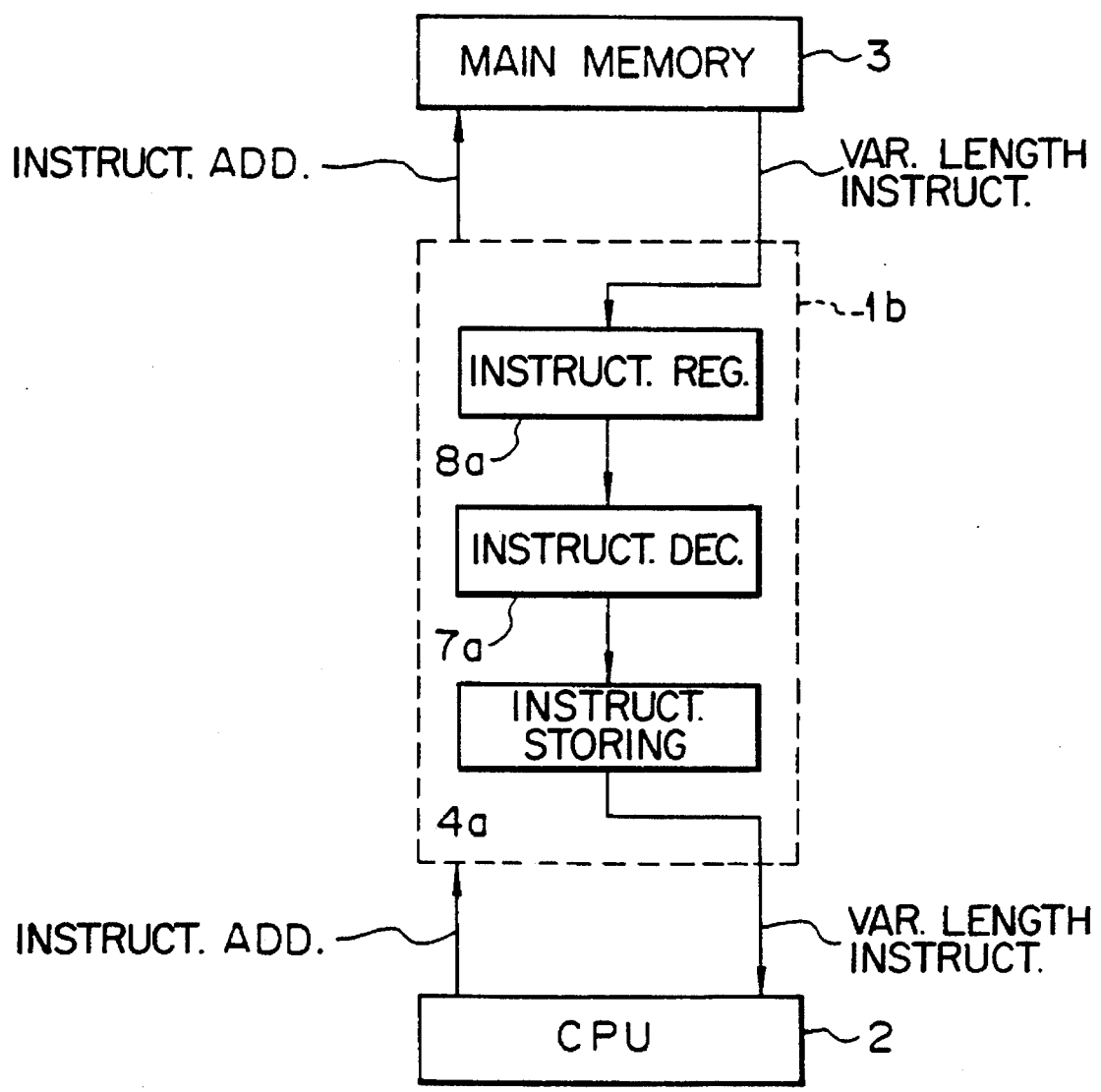
FIG. 3 is a block diagram showing a third prior art data processor using a cache memory.

FIG. 3 illustrates a constitution of a third prior art data processor using a cache memory.

In the illustration, 1b denotes a cache memory which receives and transmits instruction addresses and variable length instructions between the CPU 2 and the main memory 3. The cache memory 1b includes an instruction register 8a for storing a variable length instruction taken from the main memory 3, an instruction decoder 7a for decoding the variable length instruction from the instruction register 8a, and an instruction storing unit 4a for storing the decoded information from the instruction decoder 7a.

This arrangement, however, has a disadvantage in that a data size of the instruction storing unit 4a must be selected to be as large as that of data having the longest instruction length. Thus, the arrangement in which the cache memory 1b is provided with the instruction decoder 7a is not practical.

Figure 4:
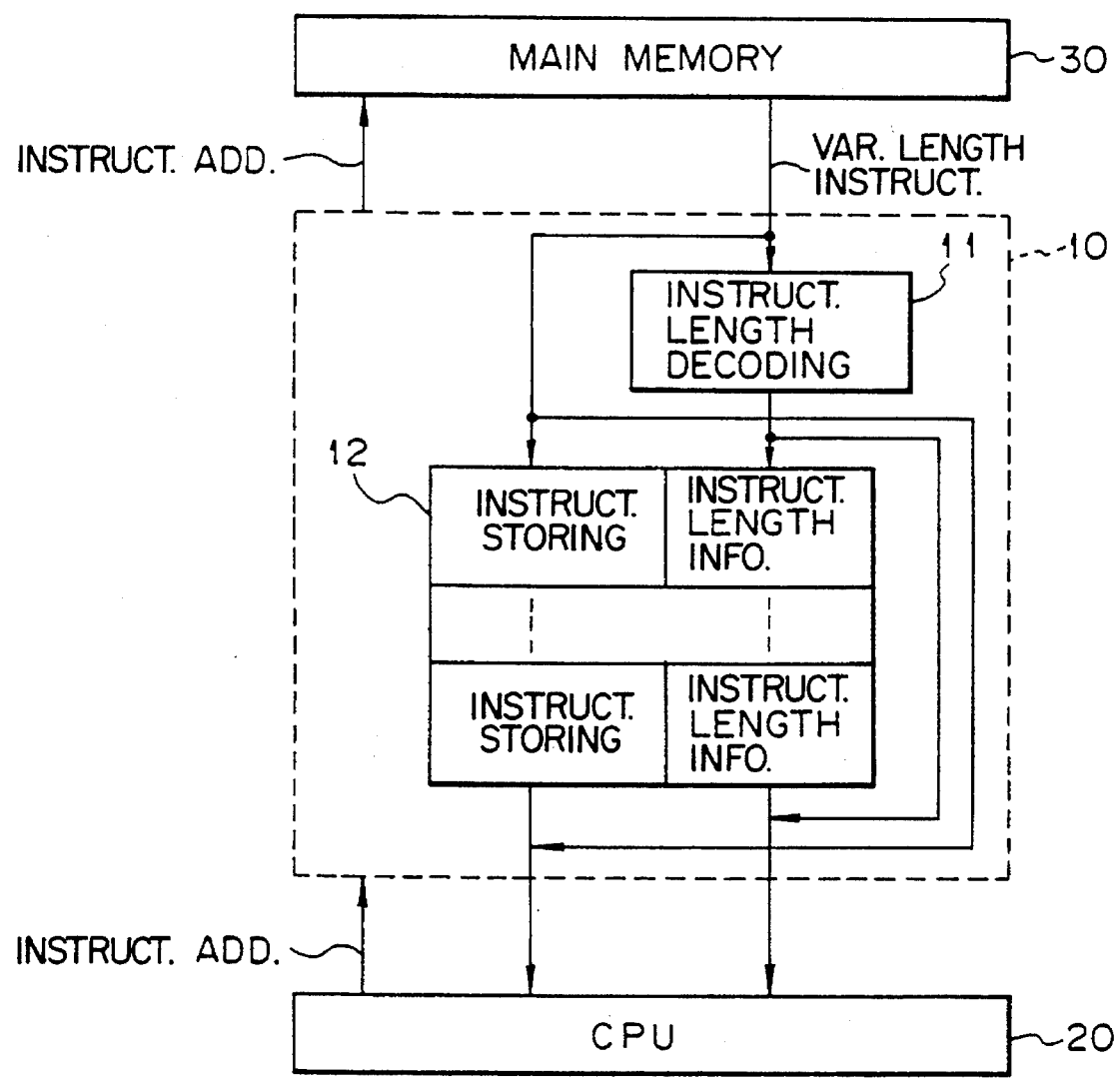
FIG. 4 is a block diagram showing a data processor using a cache memory according to a first aspect of the present invention.

FIG. 4 illustrates a fundamental constitution of a data processor using a cache memory according to the first aspect of the present invention.

In the illustration, 10 denotes a cache memory which processes at least one variable length instruction from an external memory (e.g., main memory 30) and outputs the processed information to an external control unit (e.g., CPU 20). The cache memory 10 includes an instruction length decoding unit 11 for decoding an instruction length of the variable length instruction from the external memory, and an instruction storing unit 12 for storing the variable length instruction from the external memory, together with instruction length information from the instruction length decoding unit, and outputting the variable length instruction and the instruction length information thereof to the external control unit.

In the above arrangement, where the cache memory 10 encounters the cache "hit" state, i.e. when cache "hit" state exists, the corresponding variable length instruction and the instruction length information thereof are read out from the instruction storing unit 12 and fed to the CPU 20. Thus, the CPU 20 can simultaneously decode a plurality of variable length instructions. This contributes to a high speed computing processing.

On the other hand, where the cache memory 10 encounters the cache "miss" state, the corresponding variable length instruction is taken from the main memory 30 into the cache memory 10 and the instruction length thereof is decoded by the instruction length decoding unit 11. Then, the variable length instruction and the instruction length information thereof are output to the CPU 20. Accordingly, time required until the variable length instruction is decoded by the CPU 20 becomes longer than that in the cache "hit" state. In this case (cache "miss" state) too, however, it is of course possible to simultaneously decode a plurality of variable length instructions in the CPU 20.

Figure 5:
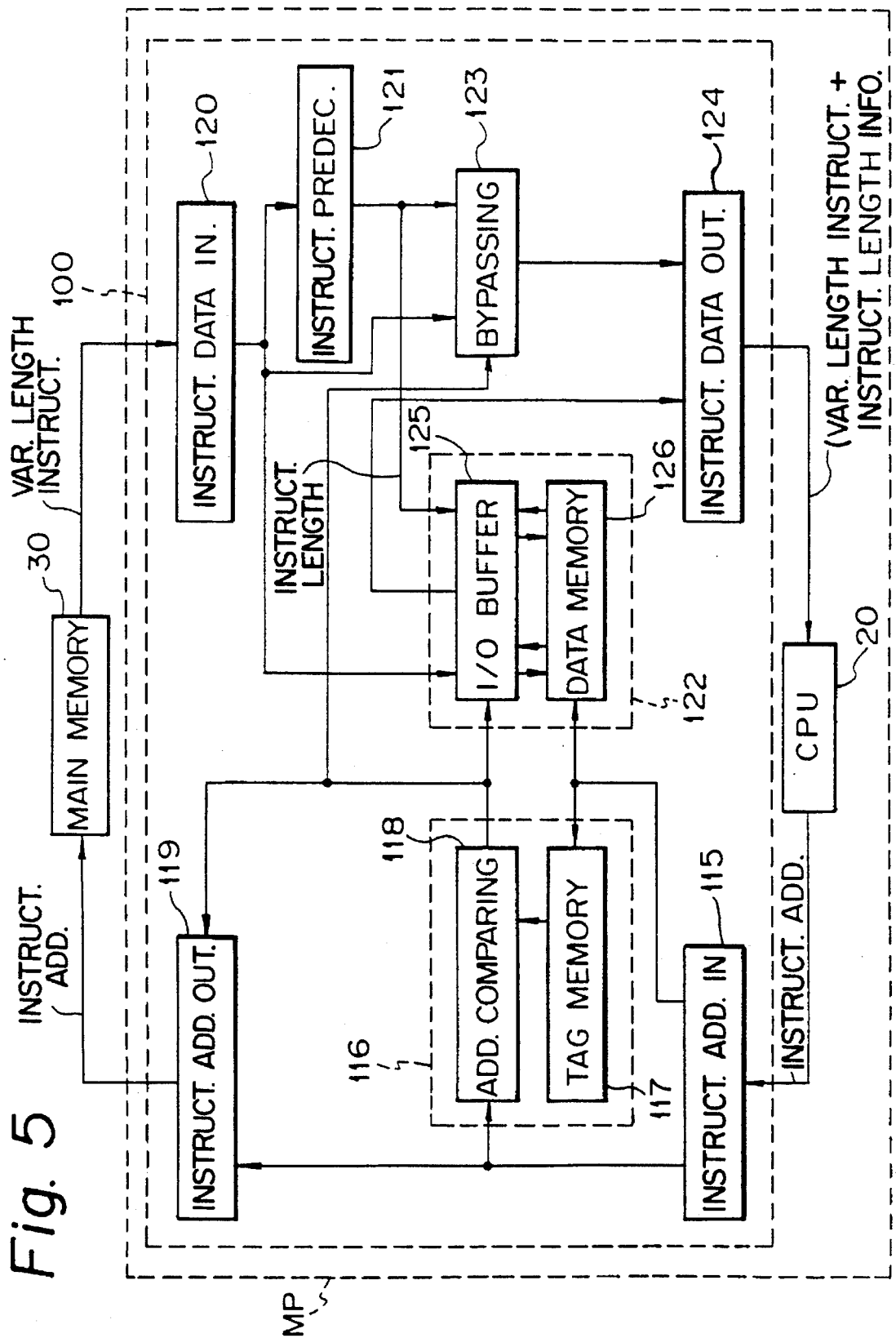
FIG. 5 is a block diagram showing the preferred embodiment of a data processor using a cache memory according to the first aspect of the present invention.

FIG. 5 illustrates the preferred embodiment of a data processor using a cache memory according to the first aspect of the present invention.

In the illustration, 100 denotes a cache memory which is integrated into a monolithic microprocessor MP including the CPU 20. Namely, the cache memory 100 is formed together with the CPU 20 in a single semiconductor substrate (not shown).

In the cache memory 100, 115 denotes an instruction address inputting unit for receiving an address from the CPU 20, the address corresponding to an instruction to be fetched from the cache memory 100 or the main memory 30.

Reference 116 denotes a cache hit/miss judging unit which compares an instruction address output from the CPU 20 with comparison addresses (tags) stored in the unit 116 and, based on a result of the comparison, judges whether a cache "hit" state or a cache "miss" state exists. The cache hit/miss judging unit 116 includes a tag memory 117, constituted by a random access memory (RAM) which stores addresses from unit 115, and an addresses comparing unit 118 for comparing the instruction address from the instruction address inputting unit with the addresses stored in the tag memory.

119 denotes an instruction address outputting unit which outputs the instruction address from the instruction address inputting unit 115 to the memory 30 when it is informed of the cache "miss" state by the address comparing unit 118.

Also, 120 denotes an instruction data inputting unit for receiving at least one variable length instruction output from the main memory 30.

121 denotes an instruction predecoder characteristic of the present embodiment. The instruction predecoder 121 decodes the variable length instruction from the main memory 30, prior to a decoding by an instruction decoder (described later) provided in the CPU 20, and produces instruction length information thereof. The instruction length information is produced, for example, as shown in the Table below.

TABLE

| inst. length information (or predecoded result) | contents |
| --- | --- |
| 0 0 0 | NOT predecoded |
| 1 0 0 | INTERMEDIATE code |
| 1 0 1 | END of inst. |
| 1 1 0 | HEAD of inst. |
| 1 1 1 | HEAD/END of inst. |

122 denotes an instruction storing unit for storing instructions including variable length instructions and corresponding instruction length information. Also, 123 denotes a bypassing unit and 124 denotes an instruction data outputting unit. The instruction storing unit 122 includes an input/output (I/O) buffer 125 and a data memory 126 constituted by a RAM, addressed by the address from unit 115 and storing the instruction received by the instruction data inputting unit 120 and the corresponding instruction length information from the instruction predecoder 121.

Where the I/O buffer 125 is informed of the cache "hit" state by the address comparing unit 118, it reads the corresponding instruction and the instruction length information thereof from the data memory 126 and transmits the read data to the instruction data outputting unit 124. On the other hand, where the I/O buffer 125 is informed of the cache "miss" state by the address comparing unit 118, it receives instruction data from the instruction data inputting unit 120 and the corresponding instruction length information thereof from the instruction predecoder 121 and writes the received data into the data memory 126.

Also, where the bypassing unit 123 is informed of the cache "miss" state by the address comparing unit 118, it receives a variable length instruction from the instruction data inputting unit 120 and the corresponding instruction length information thereof from the instruction predecoder 121 and transmits the received data to the instruction data outputting unit 124.

The instruction data outputting unit 124 receives the instruction (or variable length instruction) and the corresponding instruction length information from the instruction storing unit 122 or the bypassing unit 123 and outputs the received data to the CPU 20.

Figure 6:
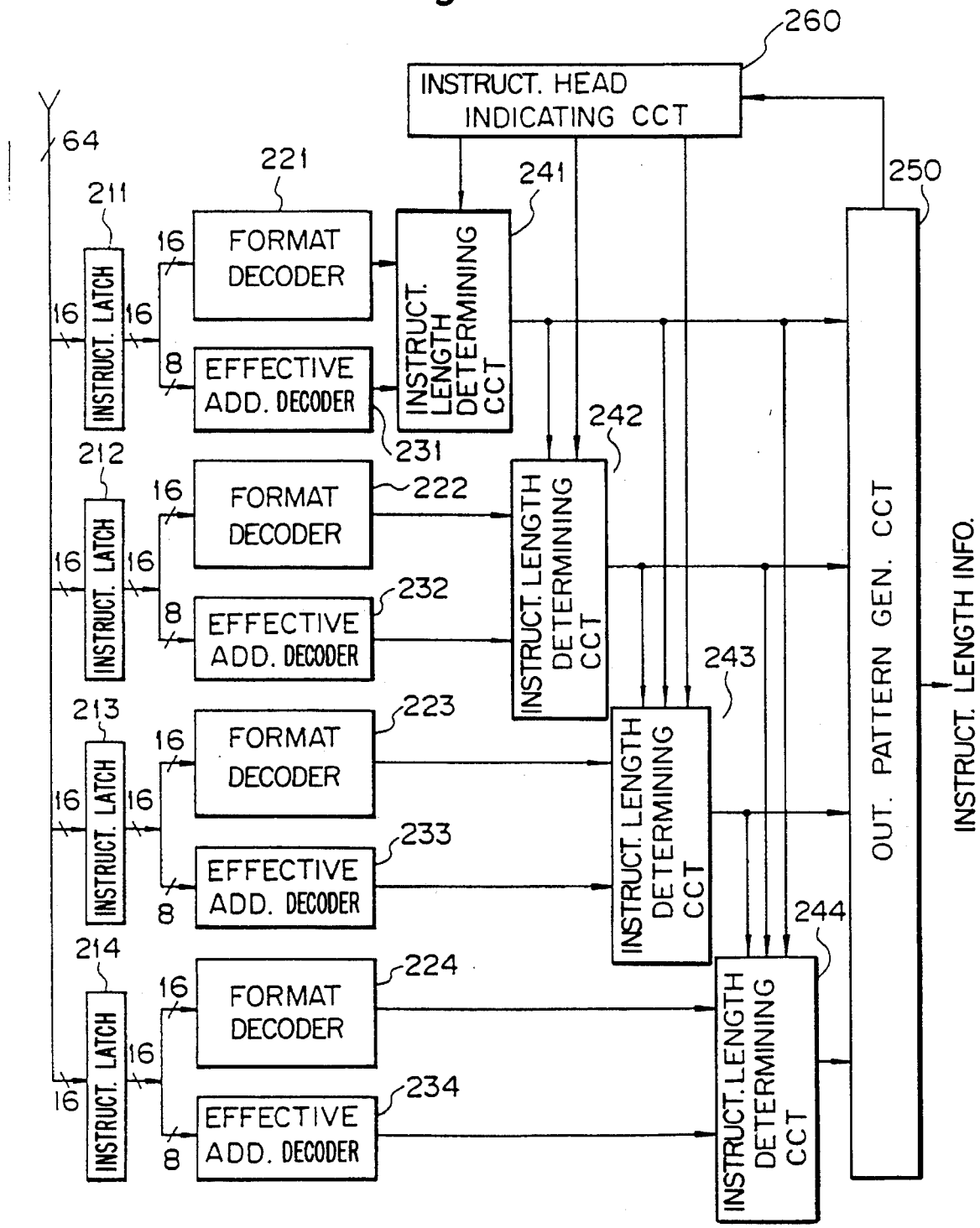
FIG. 6 is a block diagram showing a more detailed construction of the instruction predecoder shown in FIG. 5.

FIG. 6 illustrates a constitution of the instruction predecoder 121.

In the present embodiment, variable length instruction data is transmitted from the instruction data inputting unit 120 via a bus having a data width of sixty-four bits and divided into four data blocks to be input to the instruction predecoder 121. 211 to 214 denote instruction latch circuits each for latching data of sixteen bits (one half word [1 HW]) in the respective data blocks. 221 to 224 denote format decoders each for decoding a format of the data from a corresponding instruction latch circuit, and 231 to 234 denote effective address decoders each for decoding an effective address based on eight bits among the corresponding data of sixteen bits.

Also, 241 to 244 denote instruction length determining circuits each for determining an instruction length based on decoded results of the corresponding format decoder and effective address decoder. In this case, each of the instruction length determining circuits 241 to 243 is controlled by an instruction head or start indicating circuit 260 and controls any instruction length determining circuit or circuits of a lower rank. For example, the instruction length determining circuit 243 is controlled by the instruction head indicating circuit 260 and the instruction length determining circuits 241, 242 and thus controls the instruction length determining circuit 244. The instruction length determining circuit 244 is controlled by the instruction length determining circuits 241 to 243 of a higher rank.

Reference 250 denotes an output pattern generating circuit which generates instruction length information for the input variable length instruction data based on each output of the instruction length determining circuits 241 to 244. The output pattern generating circuit 250 also generates a control signal for indicating which block of the above four data blocks is at the head or start of the variable length instruction. The instruction head indicating circuit 260 responds to the control signal and controls the instruction length determining circuits 241 to 243 to enable or disable them.

FIG. 7 schematically illustrates the data memory 126.

As illustrated in FIG. 7, the data memory 126 is divided into four blocks B1 to B4, each block containing instruction data of sixteen bits (1 HW) and corresponding instruction length information of three bits. The instruction data (or variable length instruction data) is comprised of sixty-four bits at maximum.

In the above cache memory according to the present embodiment, a variable length instruction taken from the main memory 30 is stored in the instruction storing unit 122 (see FIG. 5), together with the corresponding instruction length information decoded by the instruction predecoder 121.

Therefore, where the cache memory 100 encounters the cache "hit" state, the variable length instruction and the corresponding instruction length information thereof are read out from the instruction storing unit 122 and output via the instruction data outputting unit 124 to the CPU 20. Thus, the CPU 20 can simultaneously decode a plurality of variable length instructions as described later. This contributes to a high speed computing processing.

Also, where the cache memory 100 encounters the cache "miss" state, the corresponding variable length instruction is taken from the main memory 30 into the cache memory 100 and the instruction length thereof is decoded by the instruction predecoder 121. Then, the variable length instruction and the corresponding instruction length information are output to the CPU 20. Accordingly, time required until the variable length instruction is decoded by the CPU 20 becomes longer than that in the cache "hit" state. In this case too, however, it is of course possible to simultaneously decode a plurality of variable length instructions in the CPU 20.

Figure 8B:
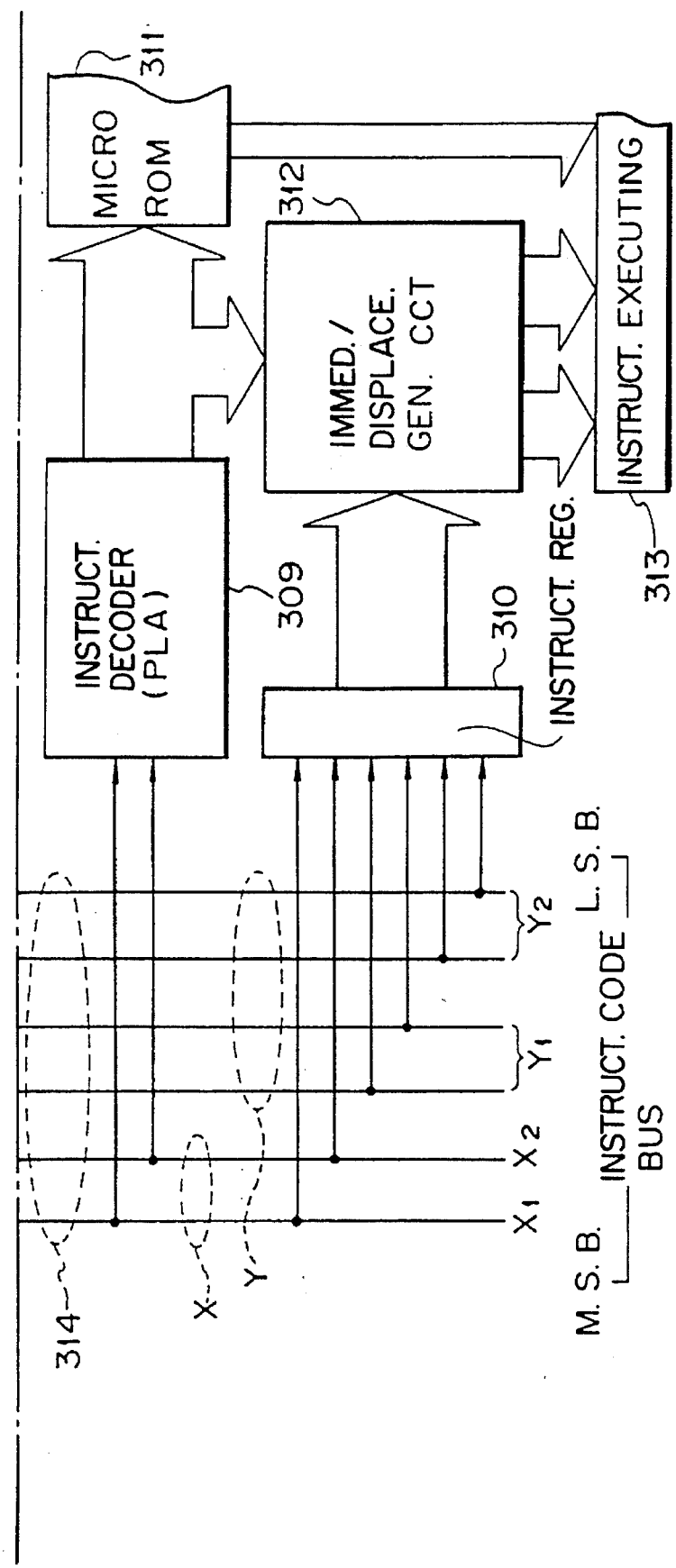
Figure 9A:
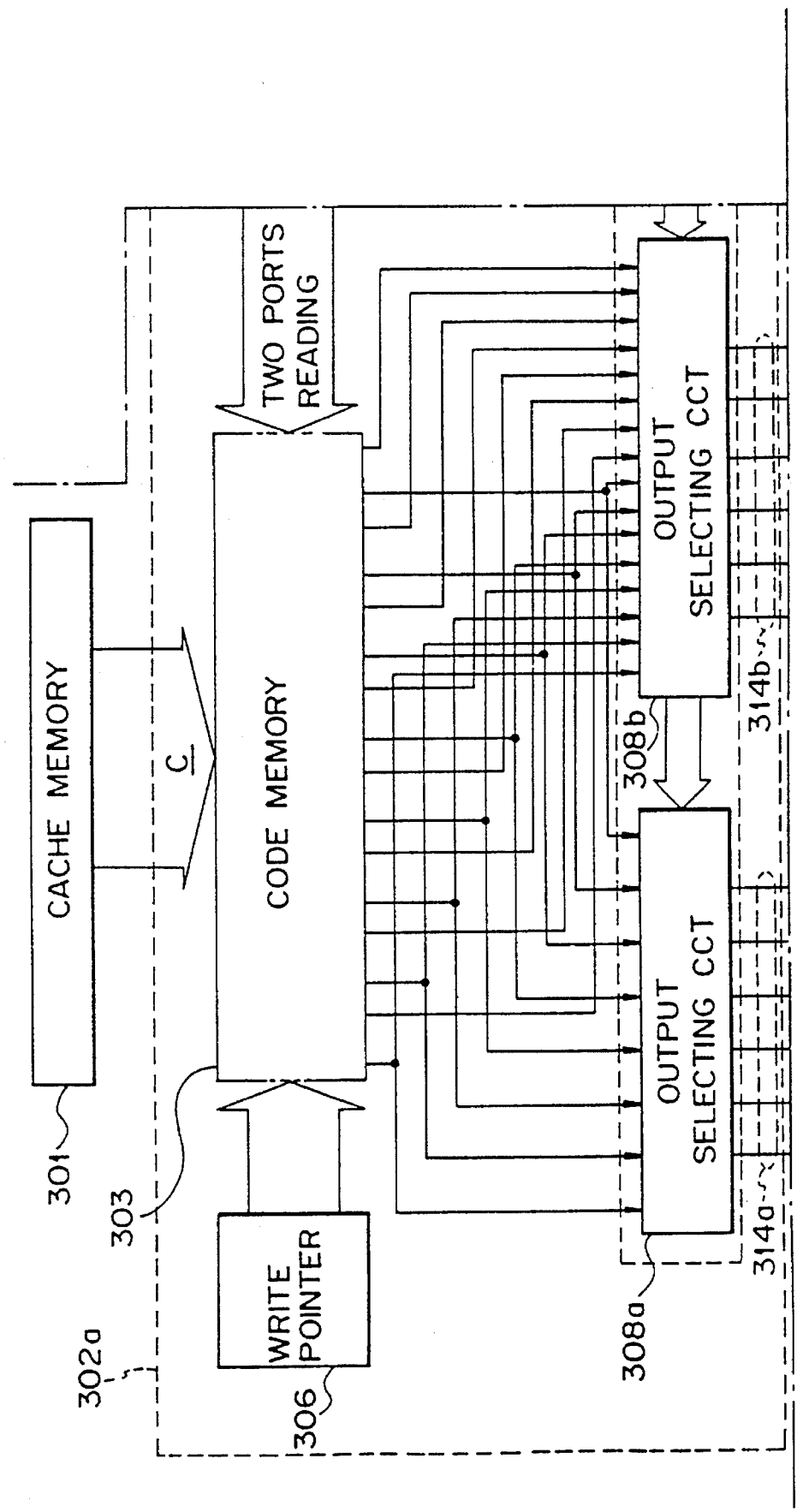
Figure 9B:
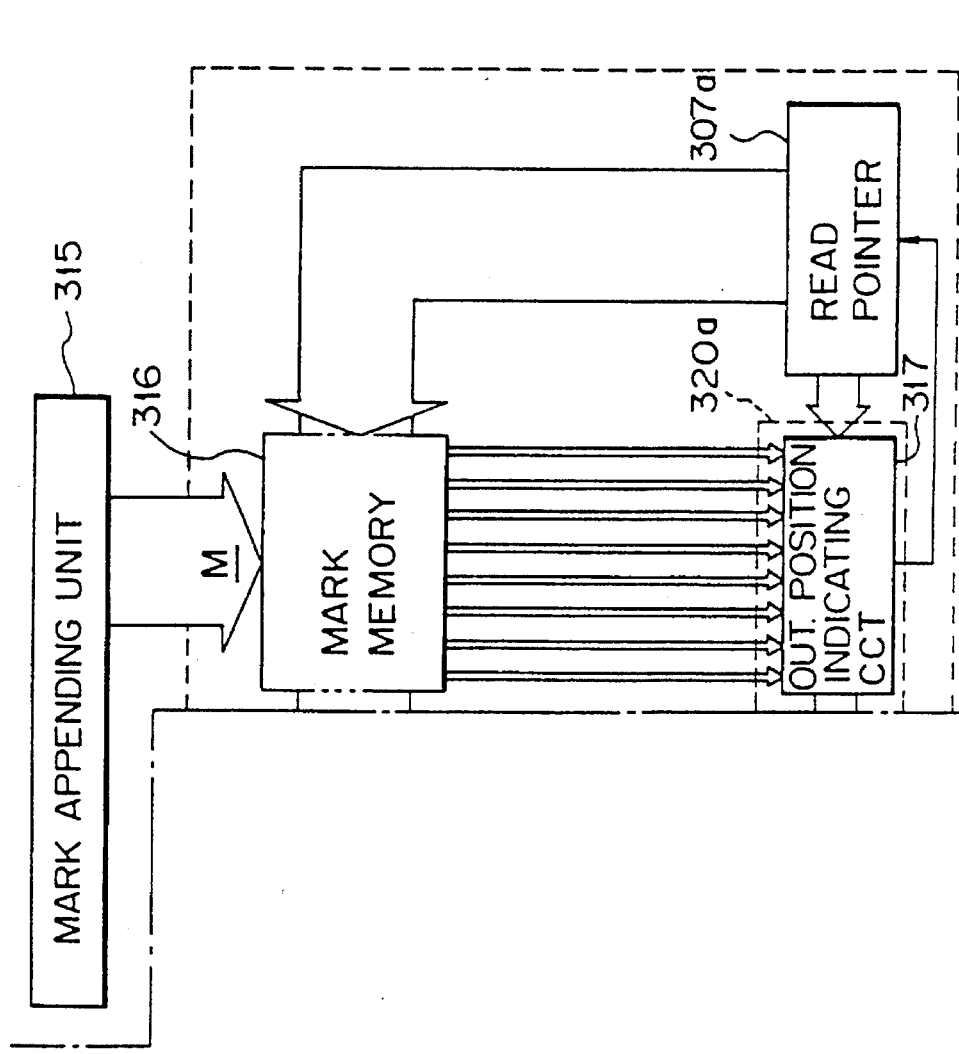
Figure 9C:
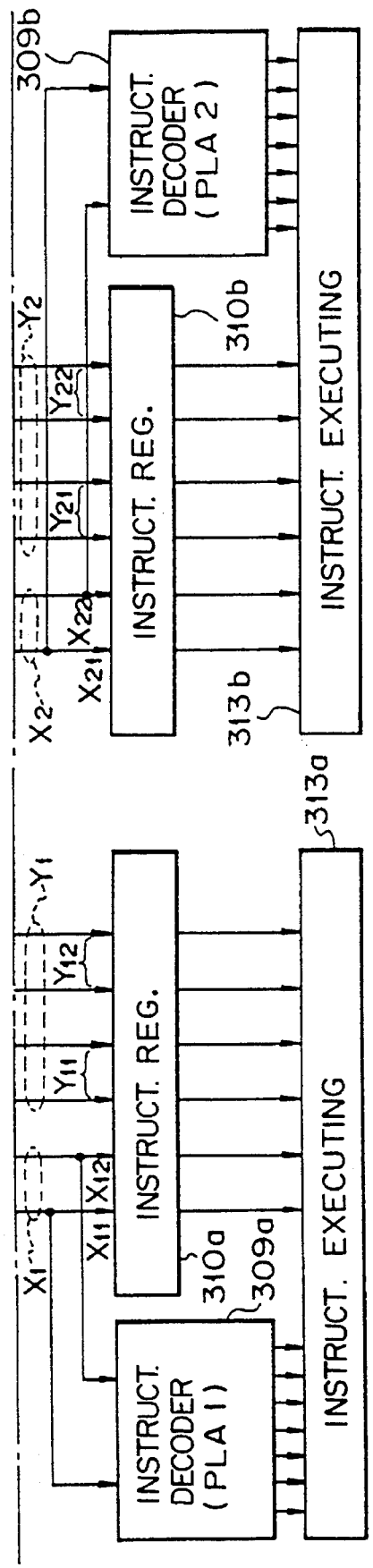

FIGS. 8, 8A and 8B together illustrate an arrangement by which the CPU 20 can simultaneously process two instructions with or without extended or additional parts.

In FIG. 8A, "C" denotes a train of instruction codes (i.e., a single instruction) made up of a set consisting of a basic part and an extended or additional part or a plurality of sets. The basic part includes a code for classifying the kind of the instruction, and the additional part is defined according to the content of the basic part and has a variable length. 301 denotes a cache memory which may be the cache memory 100 shown in FIG. 5. 315 denotes a mark appending unit constituted by, e.g., a predecoder. The mark appending unit 315 judges whether data having a length of the predetermined number of bits as one unit in the train of instruction codes "C" is a basic part or not, and appends a predetermined mark "M" thereto.

302 denotes an instruction buffer unit, which includes a code memory unit 303 for reading the train of instruction codes "C" and storing them, a mark memory unit 316 for storing the mark "M", a write pointer 306 for designating a write address in the code memory unit 303, a read pointer 307 for designating a head or start position of a predetermined train of instruction codes to be selectively output from the code memory unit 303, an output position indicating circuit 317, responsive to the output of the read pointer 307 and information from the mark memory unit 316, for designating an output position of the predetermined train of instruction codes, and an output selecting circuit 308, responsive to the output of the output position indicating circuit 317, for selectively outputting the predetermined train of instruction codes from the code memory unit 303.

309 (FIG. 8B) denotes an instruction decoder constituted by a programmable logic array (PLA) and reference 310 denotes an instruction register. The instruction decoder 309 and the instruction register 310 are connected via an instruction code bus 314 to the output selecting circuit 308. The bus 314 is sectioned into a plurality of different fields "X", "Y".

The output selecting circuit 308 (FIG. 8A) and the output position indicating circuit 317 constitute a control unit 320. The control unit 320 links specific instruction portions, where the mark "M" indicates a basic part in the predetermined train of instruction codes, within a predetermined range. The unit 320 also controls the linked data to be output to one field of the bus 314 (FIG. 8B). In like manner, the control unit 320 controls instruction portions, where the mark "M" indicates an additional part in the predetermined train of instruction codes, to be output to another field of the bus 314.

The train of instruction codes output to the bus 314 is input via the instruction register 310 to an immediate/displacement address generating circuit 312 which generates the immediate or displacement address of the operands. The circuit 312 executes computing based on information from the instruction decoder 309 and outputs the executed result to an instruction executing unit 313. Additionally, reference 311 denotes a micro ROM for controlling micro instructions to be executed by the instruction executing unit 313.

FIGS. 9, 9A to 9C together illustrate another constitution by which the CPU 20 can simultaneously process two instructions each having a variable length extended part.

The fundamental constitution and the operation thereof are substantially the same as those in FIGS. 8A and 8B, except that there are provided a pair of output selecting circuits 308a, 308b (FIG. 9A), a pair of instruction decoders 309a, 309b (FIG. 9C), a pair of instruction registers 310a, 310b, and a pair of instruction executing units 313a, 313b. Note that instruction executing unit 313a, 313b directly executes the respective instruction based on information from the corresponding instruction decoder 309a, 309b and the output of the corresponding instruction register 310a, 310b.

The control mark "M" requires at least two bits per instruction code, having a length of the predetermined number of bits as one unit, for the control of the instruction buffer unit 302a. For example, "00" indicates portions except for a basic part; "01" indicates a basic part decodable simultaneously with a previous basic part; "10" indicates a basic part in the same instruction as a previous basic part, but not decodable simultaneously therewith; and "11" indicates a basic part in an instruction different from a previous basic part.

Since the pair of instruction decoders 309a, 309b are provided, the greatest length of an instruction code to be processed in one cycle becomes twice that in the case of a single instruction decoder. To cope with this disadvantage, the number of the read ports is increased to twice that in the case of the single instruction decoder.

Also, the output selecting circuits 308a and 308b have different constitutions. Namely, the train of instruction codes to be sent to the instruction decoder 309a is selected from the output of the first read port, while the train of instruction codes to be sent to the instruction decoder 309b lies within the address space of the first read port or within both the first read port and the second read port. To this end, the second output selecting circuit 308b must select the output to be sent to the bus from among all of the outputs of the first and second read ports.

Next, a preferred embodiment according to the second aspect of the present invention will be explained with reference to FIGS. 10 to 12 and FIG. 2.

In a like manner as in the first embodiment, the related prior art will be first explained with reference to FIGS. 10 and 2. The explanation on FIG. 2 is previously given and thus is omitted.

Figure 10:
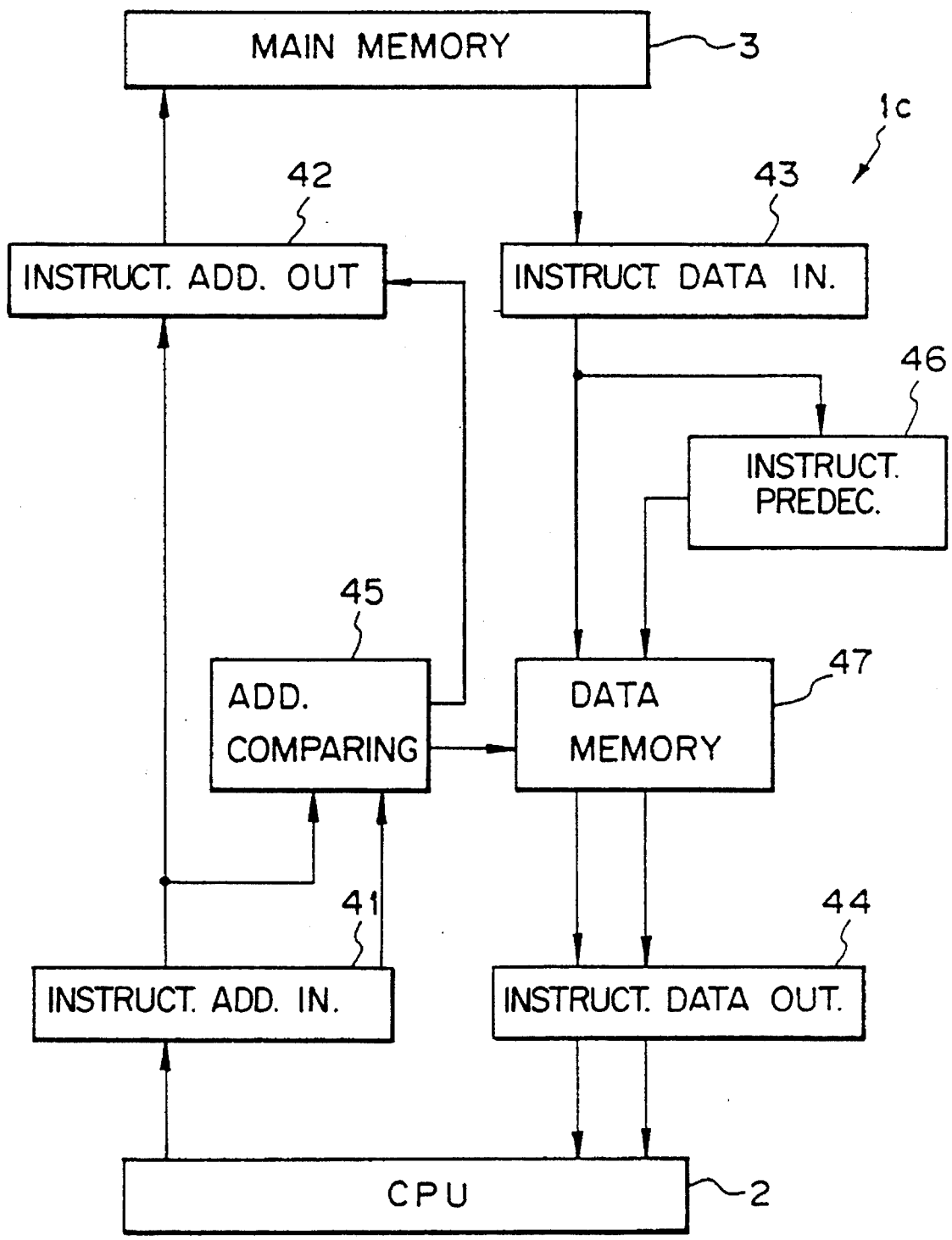
FIG. 10 is a block diagram showing a fourth prior art data processor using a cache memory.

FIG. 10 illustrates a fourth prior art data processor using a cache memory.

In the illustration, reference 1c denotes a cache memory which receives and transmits instruction data and instruction addresses between the CPU 2 and the main memory 3. The cache memory 1c includes an instruction address inputting unit 41 for receiving an instruction address from the CPU 2, an instruction address outputting unit 42 for outputting the instruction address to the main memory 3 in the cache "miss" state, an instruction data inputting unit 43 for receiving corresponding instruction data from the main memory 3, an instruction data outputting unit 44 for outputting the instruction data and corresponding predecoded information (described later) to the CPU 2 under a predetermined condition, an address comparing unit 45 for comparing the instruction address from the instruction address stored in unit 45 inputting unit 41 with a comparison address stored in unit 45 and judging or determining whether a cache "hit" state or a cache "miss" state exists or is encountered, an instruction predecoder 46 for predecoding the instruction data from the instruction data inputting unit 43, and a data memory unit 47 for storing the predecoded information together with the corresponding instruction data and, based on a result of the judging of the address comparing unit 45, outputting the instruction data and the predecoded information to the instruction data outputting unit 44.

Since the predecoded information is stored in the data memory unit 47 together with the corresponding instruction data, the instruction data and the predecoded information can be simultaneously output to the CPU 2 in the cache "hit" state. This allows the CPU 2 to simultaneously decode two instructions.

A problem is posed, however, where loading is carried out in units of data blocks by a wraparound when the instruction data is stored or registered in the data memory unit 47. Namely, since it is impossible to discriminate whether a head or starting portion of the respective data block is at a break of the instruction, it is almost impossible to store a valid predecoded information. Such a problem also occurs in the case that access is started midway in the data block, e.g., based on a branch processing. Also, where the predecoded information proves to be "invalid" even in the cache "hit" state, predecoding of an instruction data must again be carried out. This, however, leads to a cancellation of the above advantage (simultaneous decoding of two instructions) and thus is not preferable.

Figure 11:
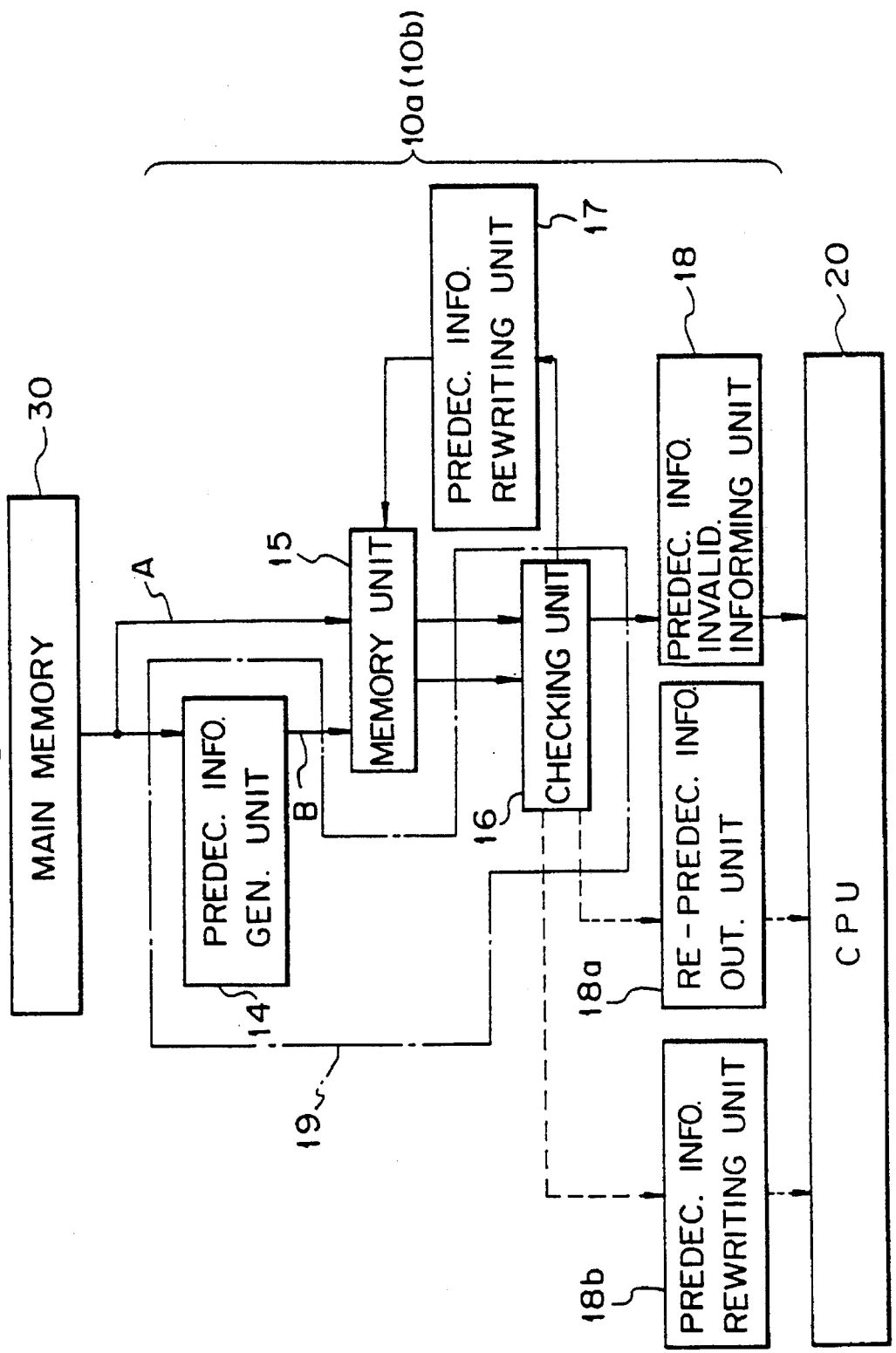
FIG. 11 is a block diagram showing a data processor using cache memory according to a second aspect of the present invention.

FIG. 11 illustrates a fundamental constitution of a data processor using a cache memory according to the second aspect of the present invention.

In the illustration, reference 10a (or 10b) denotes a cache memory which processes an instruction data "A" from an external memory (e.g., main memory 30) and outputs the processed information to an external control unit (e.g., CPU 20). The cache memory 10a includes: a unit 14 for generating predecoded information "B" and serving as an auxiliary decoder for the instruction decoder; a memory unit 15 for storing the predecoded information together with the instruction data; a unit 16 for checking the predecoded information from the memory unit and the corresponding instruction data when in a cache hit state; a rewriting unit 17 for, when the checked predecoded information proves to be invalid or wrong, correctly rewriting corresponding predecoded information in the memory unit; and a control information outputting unit 18, 18a or 18b for, when the checked predecoded information proves to be invalid or wrong, outputting control information reflecting a result of the predecoded information check operation to the external control unit.

The control information outputting unit may be constituted by a unit 18 for, when the checked predecoded information proves to be invalid or wrong, informing the CPU 20 of the invalidity of the predecoded information. Otherwise, the control information outputting unit may be constituted by a unit 18a for, when the checked predecoded information proves to be invalid or wrong, outputting re-predecoded informations, or information that has again been predecoded, to the CPU 20, or may be constituted by a unit 18b for, when the checked predecoded information proves to be invalid or wrong, correctly rewriting the corresponding predecoded information to be output to the CPU 20.

Also, in a modification of the present invention, the cache memory 10b may include a unit 19 having both the function of generating the predecoded information "B" and the function of checking predecoded information output from the memory unit 15 and corresponding instruction data, in the cache hit state.

According to the second aspect of the present invention, the instruction data "A" together with the predecoded information "B" is stored in the memory unit 15 and, where the cache memory encounters the cache "hit" state, the instruction data and the corresponding predecoded information are read out from the memory unit 15 and output to the CPU 20. Thus, the CPU 20 can utilize the predecoded information without causing an increase in overhead (extra cycles, e.g.) in the instruction predecording and can simultaneously decode a plurality of instructions since decoding of another instruction can precede in parallel. This contributes to high speed processing.

Also, the checking unit 16 checks a validity or invalidity of the predecoded information output from the memory unit 15 and, where the predecoded information proves to be invalid, the rewriting unit 17 correctly rewrites the invalid predecoded information. As a result, it is possible to reduce overhead in the next (second) instruction fetch and thereafter. Therefore, even when loading is carried out in units of data blocks by a wrap-around in the registration or storage of the instruction data into the memory unit 15 such that the memory acts like a ring buffer, it is possible to store valid predecoded information. In other words, it is possible to prevent a lowering in the performance which may possibly occur when non-predecoded information is stored into the memory unit 15. This contributes to an improvement in the performance of the CPU 20.

Additionally, where the CPU 20 processes a variable length instruction, instruction length information for the variable length instruction replaces the above predecoded information and processed in the like manner.

Figure 12:
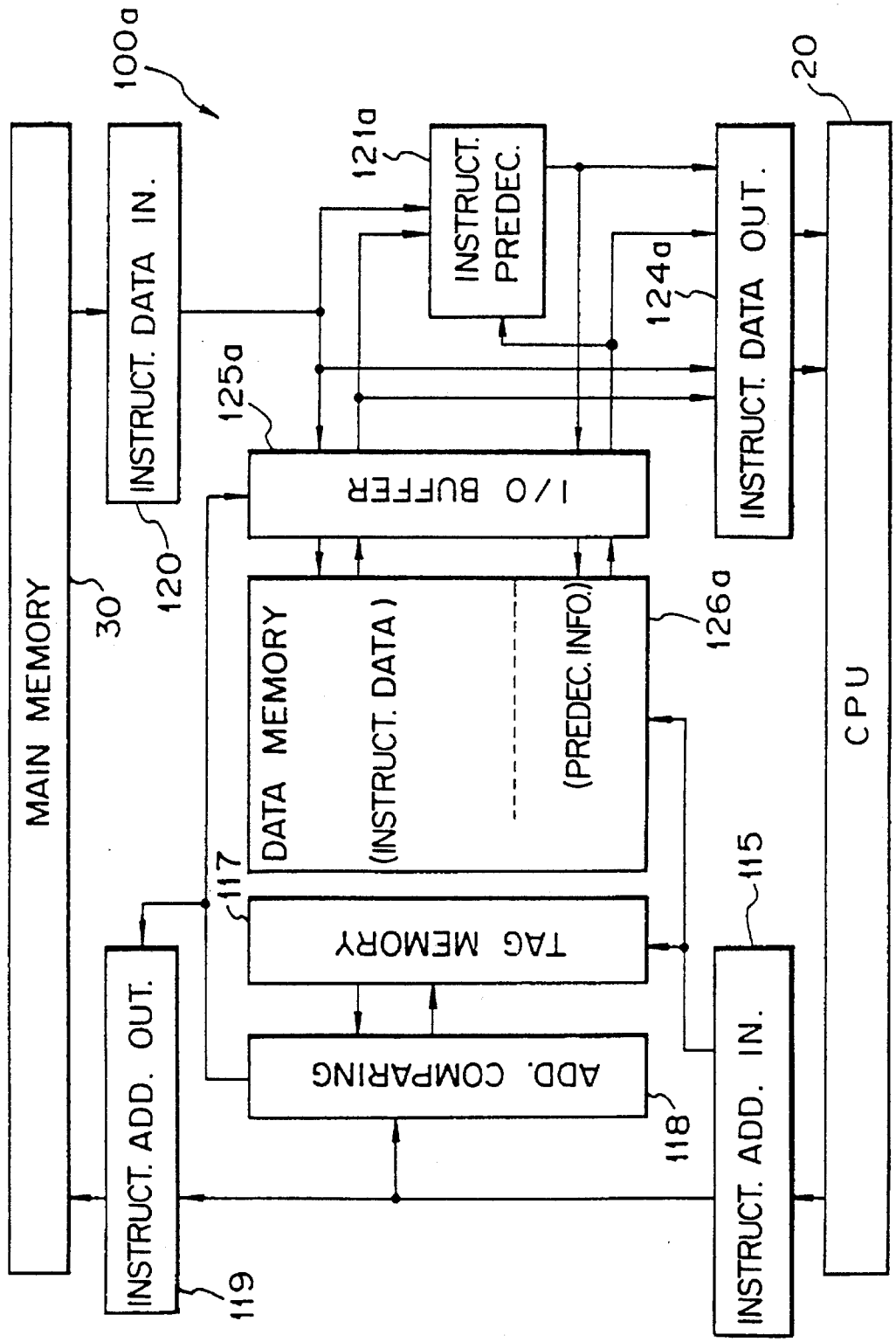
FIG. 12 is a block diagram showing a data processor using a cache memory according to the second aspect of the present invention.

FIG. 12 illustrates a constitution of the preferred embodiment of a data processor using a cache memory according to the second aspect of the present invention.

The illustrated constitution and the operation thereof are substantially the same as those in FIG. 5, except a number of points described below, and thus the explanation thereof is omitted.

First, the cache memory 100a of the present embodiment processes the predecoded information instead of the instruction length information as in the cache memory 100 of FIG. 5. Where the CPU 20 processes a variable length instruction, however, the predecoded information is replaced by instruction length information corresponding to the variable length instruction.

When the cache "miss" state is encountered, the instruction predecoder 121a predecodes instruction data from the instruction data inputting unit 120. Also, when the cache "hit" state is encountered, the instruction predecoder 121a checks whether predecoded information from the I/O buffer 125a is correct for the corresponding instruction data, and outputs the checked result (predecoded result).

The data memory 126a is constituted by a RAM and stores the instruction data received at the instruction data inputting unit 120 and the corresponding predecoded information.

Where the I/O buffer 125a is informed of the cache "hit" state by the address comparing unit 118, it reads the corresponding instruction data and the predecoded information thereof from the data memory 126a and transmits the read data to the instruction data outputting unit 124a. On the other hand, where the I/O buffer 125a is informed of the cache "miss" state by the address comparing unit 118, it receives the corresponding instruction data from the instruction data inputting unit 120 and the predecoded result thereof from the instruction predecoder 121a and writes the received data into a designated address in the data memory 126a. Also, the I/O buffer 125a has the function of correctly rewriting the predecoded information written in the designated address of the data memory 126a based on the rewrite instruction from the instruction predecoder 121a.

When the cache "miss" state is encountered, the instruction data outputting unit 124a receives the corresponding instruction data from the instruction data inputting unit 120 and the predecoded result thereof from the instruction predecoder 121a and transmits the received data to the CPU 20. Also, where the cache "hit" state is encountered, the instruction data outputting unit 124a receives the corresponding instruction data and the predecoded information thereof from the I/O buffer 125a and transmits the received data to the CPU 20. Furthermore, where the predecoded result from the instruction predecoder 121a indicates "invalid", the instruction data outputting unit 124a informs the CPU 20 of the invalidity of the predecoded information and transmits the correct predecoded information rewritten by the I/O buffer 125a to the CPU 20.

The predecoded result or information by the instruction predecoder 121a is shown in the aforementioned Table.

The predecoded result is produced for data units of every instruction length and stored in the data memory 126a together with corresponding instruction data. Also, the predecoded result indicates that an instruction starting with an instruction data indicating the head of the instruction and ending with an instruction data indicating the end thereof is processed as a single instruction. As for an instruction having a predetermined instruction length as one unit, a predecoded information indicating the head and end of the instruction is appended thereto.

Where a loading is carried out in units of data blocks by a wrap-around in a ring buffer style, i.e., when the instruction head cannot be discriminated because it is split, a predecoded information indicating "NOT predecoded" state is appended to the instruction.

According to the cache memory 100a of the present embodiment, the instruction data from the instruction data inputting unit 120 and the corresponding predecoded result from the instruction predecoder 121a are stored via the I/O buffer 125a into the designated address of the data memory 126a in the cache "miss" state. On the other hand, where the cache "hit" state is encountered, the corresponding instruction data and the predecoded information are read out from the data memory 126a and output via the I/O buffer 125a and the instruction data outputting unit 124a to the CPU 20. Therefore, the CPU 20 can utilize the predecoded information output from the data memory 126a without additional overhead and can simultaneously decode a plurality of instructions.

Also, the instruction predecoder 121a checks a validity or invalidity of the predecoded information output from the data memory 126a and, where the predecoded information proves to be invalid, the I/O buffer 125a correctly rewrites the invalid predecoded information based on a rewrite instruction from the instruction predecoder 121a. As a result, it is possible to reduce overhead in the next (second) instruction fetch and thereafter. Namely, although time for predecoding is again required where the predecoded information from the data memory 126a proves to be invalid, the time is required only in the first instruction fetch. The time is negligible, compared with the case in the cache "miss" state (i.e., instruction fetch from the main memory 30).

Furthermore, even when loading is carried out in units of data blocks by wrap-around in the storage of the instruction data in the data memory 126a, it is possible to store valid predecoded information. As a result, it is possible to prevent a lowering in the performance which may possibly occur when a non-predecoded information is stored into the data memory 126a. This contributes to an improvement in the performance of the CPU 20.

Although the present invention has been disclosed and described by way of two embodiments, it is apparent to those skilled in the art that other embodiments and modifications of the present invention are possible without departing from the spirit or essential features thereof.

We claim:

1. A cache memory for storing at least one variable length instruction from a memory and outputting stored information to control means, the cache memory comprising:

instruction length decoding means for decoding an instruction length of the variable length instruction from the memory; and instruction storing means for storing the variable length instruction from the memory and corresponding instruction length information from the instruction length decoding means, and outputting the variable length instruction and the corresponding instruction length information thereof to the control means, the instruction storing means comprising:

memory means for storing the variable length instruction output from the memory and the corresponding instruction length information from the instruction length decoding means; and means for reading an instruction and corresponding instruction length information from the memory means when a cache hit occurs indicating the instruction and the corresponding instruction length information are in said memory means and transmitting the instruction and corresponding instruction length information from the memory means to the control means, and for receiving the instruction output from the memory and the corresponding instruction length information from the instruction length decoding means when a cache miss occurs indicating the instruction and the corresponding instruction length information are not in said memory means and writing the received instruction and corresponding instruction length information into the memory means.

2. A cache memory as set forth in claim 1, further comprising means for, after the instruction and corresponding instruction length information are stored in said memory means, receiving the instruction output from the memory and the corresponding instruction length information from the instruction length decoding means when the cache miss occurs and transmitting the received instruction and the corresponding instruction length information which is stored in the memory means to the control means.

3. A cache memory as set forth in claim 1, wherein the memory is divided into data blocks and the instruction length decoding means comprises:

means for latching variable length instruction data having a head and output from the memory;

means for decoding an instruction format and an effective address from the variable length instruction data for every data block and providing decoded results;

instruction length determining means for determining instruction lengths based on the decoded results for every data block;

means for generating instruction length information for the latched variable length instruction data based on the determined instruction lengths, and for generating a control signal indicating which block of the data blocks is at a head of the variable length instruction; and means, responsive to the control signal, for controlling operation of the instruction length determining means.

4. A cache memory as set forth in claim 3, further comprising cache hit/miss judging means for judging whether the cache memory is in a cache hit state or a cache miss state.

5. A cache memory as set forth in claim 4, wherein the cache hit/miss judging means comprises:

means for storing comparison addresses; and means for comparing an instruction address from the control means with the comparison addresses to judge whether the cache memory is in the cache hit state or the cache miss state.

6. A data processor connected to a main memory, said data processor comprising:

processing means for outputting an instruction address for fetching a variable length instruction; and a cache memory connected between the processing means and the main memory, the cache memory including:

instruction length decoding means for decoding a corresponding instruction length of the variable length instruction from the main memory; and instruction storing means for storing the variable length instruction from the main memory and corresponding instruction length information from the instruction length decoding means, and outputting the variable length instruction and the corresponding instruction length information thereof to the processing means, and wherein the processing means comprises:

code storing means for storing a train of instruction codes comprising a plurality of sets, each having a basic part and an extended part;

means for judging whether data in the train of instruction codes is a basic part and, if so, for appending a control mark to that basic part;

mark storing means for storing the control mark;

head position designating means for designating a head position of the train of instruction codes to be selectively output from the code storing means;

output position designating means, responsive to outputs of the head position designating means and the mark storing means, for designating an output position of the train of instruction codes;

selective outputting means, responsive to outputs of the output position designating means and the outputs of the mark storing means, for selectively outputting the train of instruction codes from the code storing means;

instruction code decoding means for decoding instruction codes output from the selective outputting means;

register means for storing the train of instruction codes output from the selective outputting means;

generating means, responsive to outputs of the instruction code decoding means and the register means, for generating one of an immediate address value for an instruction and a displacement address value for an instruction; and means for executing an instruction based on outputs of the generating means.

7. A data processor as set forth in claim 6, wherein the instruction storing means comprises:

memory means for storing the variable length instruction output from the memory and corresponding instruction length information from the instruction length decoding means; and means for reading an instruction and corresponding instruction length information from the memory means in a cache hit state indicating the instruction and the corresponding instruction length information are in the memory means and transmitting the instruction and corresponding instruction length information read from the memory means to the control means, and for receiving the instruction output from the memory and the corresponding instruction length information from the instruction length decoding means in a cache miss state indicating the instruction and the corresponding instruction length information are not in the memory means and writing the received instruction and corresponding instruction length information into the memory means.

8. A data processor as set forth in claim 7, further comprising means for, after the instruction and corresponding instruction length information are stored in said memory means, receiving the instruction output from the memory and the corresponding instruction length information from the instruction length decoding means in the cache miss state and transmitting the received instruction and the corresponding instruction length information stored in the memory means to the control means.

9. A data processor as set forth in claim 7, wherein the memory is divided into data blocks and the instruction length decoding means comprises:

means for latching variable length instruction data having a head and output from the memory;

means for decoding an instruction format and an effective address from the variable length instruction data for every data block and providing decoded results;

means for determining instruction lengths based on the decoded results for every data block;

means for generating instruction length information for the latched-variable length instruction data based on the determined instruction lengths, and generating a control signal indicating which block of the data blocks is at the head of the variable length instruction; and means, responsive to the control signal, for controlling operation of the instruction length determining means.

10. A data processor connected to a main memory, said data processor comprising:

processing means for outputting an instruction address for fetching a variable length instruction; and a cache memory connected between the processing means and the main memory, the cache memory including:

instruction length decoding means for decoding a corresponding instruction length of the variable length instruction from the main memory; and instruction storing means for storing the variable length instruction from the main memory and corresponding instruction length information from the instruction length decoding means, and outputting the variable length instruction and the corresponding instruction length information thereof to the processing means, and wherein said processing means comprises:

code storing means for storing a train of instruction codes comprising a plurality of sets, each having a basic part and an extended part;

means for judging whether data in the train of instruction codes is a basic part and, if so, for appending a control mark to that basic part;

mark storing means for storing the control mark;

head position designating means for designating a head position of the train of instruction codes to be selectively output from the code storing means, by means of two read ports;

output position designating means, responsive to outputs of the head position designating means and the mark storing means, for designating an output position of the train of instruction codes;

a pair of output selecting units, responsive to outputs of the output position designating means and the outputs of the mark storing means, each for selectively outputting a respective allocated portion of the train of instruction codes from the code storing means;

a pair of decoding units each for decoding instruction codes output from a corresponding output selecting unit;

a pair of register units each for storing instruction codes output from a corresponding output selecting unit; and a pair of instruction executing units each for executing a respective instruction based on outputs of a corresponding decoding unit and a corresponding register unit.

11. A data processor as set forth in claim 10, wherein the instruction storing means comprises:

memory means for storing the variable length instruction output from the memory and corresponding instruction length information from the instruction length decoding means; and means for reading an instruction and corresponding instruction length information from the memory means in a cache hit state indicating the instruction and the corresponding instruction length information are in the memory means and transmitting the instruction and corresponding instruction length information read from the memory means to the control means, and for receiving the instruction output from the memory and the corresponding instruction length information from the instruction length decoding means in a cache miss state indicating the instruction and the corresponding instruction length information are not in the memory means and writing the received instruction and corresponding instruction length information into the memory means.

12. A data processor as set forth in claim 11, further comprising means for, after the instruction and corresponding instruction length information are stored in said memory means, receiving the instruction output from the memory and the corresponding instruction length information from the instruction length decoding means in the cache miss state and transmitting the received instruction and the corresponding instruction length information stored in the memory means to the control means.

13. A data processor as set forth in claim 11, wherein the memory is divided into data blocks and the instruction length decoding means comprises:

means for latching variable length instruction data having a head and output from the memory;

means for decoding an instruction format and an effective address from the variable length instruction data for every data block and providing decoded results;

instruction length determining means for determining instruction lengths based on the decoded results;

means for generating instruction length information for the latched variable length instruction data based on the determined instruction lengths, and generating a control signal indicating which block of the plurality of data blocks is at the head of the variable length instruction; and means, responsive to the control signal, for controlling operation of the instruction length determining means.

14. A data processing system, comprising:

a main memory;

a processor for outputting an instruction address of a variable length instruction; and a cache memory connected between said main memory and said processor, said cache memory comprising:

an instruction memory, connected to said main memory and said processor, for storing variable length instructions;

an instruction length memory, connected to said processor, for storing information corresponding to instruction lengths of the variable length instructions;

an instruction length decoder, connected to said main memory, said instruction length memory and said processor, for decoding the information corresponding to the instruction lengths of the variable length instructions from said main memory;

a cache hit detection circuit, connected to said instruction memory, said main memory and said processor, for causing said instruction memory and said instruction length memory to output the variable length instructions and corresponding instruction lengths of the variable length instructions to said processor in a cache hit state responsive to the instruction address, and for causing said main memory and said instruction length decoder to output the variable length instructions and corresponding instruction lengths of the variable length instructions to said processor in a cache miss state responsive to the instruction address.

* * * * *

UNITED STATES PATENT AND TRADEMARK OFFICE
CERTIFICATE OF CORRECTION

PATENT NO. : 5,488,710

DATED : January 30, 1996

INVENTOR(S) : Taizo Sato et al

It is certified that error appears in the above-identified patent and that said Letters Patent is hereby corrected as shown below:

In the drawings Sheet 13 of 15, Figure 10, please delete the straight line and arrow between elements 41 and 45.

Column 2, line 56, "8" should be deleted;
        line 59, "9" should be deleted.

Column 5,
        line 20, "an addresses" should read --an address--
        line 22, "addresses" should be --addresses--;
        line 56, "unit" should be deleted.

UNITED STATES PATENT AND TRADEMARK OFFICE
CERTIFICATE OF CORRECTION

PATENT NO. : 5,488,710

DATED : January 30, 1996

INVENTOR(S) : Taizo Sato et al

It is certified that error appears in the above-identified patent and that said Letters Patent is hereby corrected as shown below:

Column 10, line 3, "informations" should be --information--;
        line 22, "predecording" should be --predecoding--.

Column 14, line 49, "latched-variable" should be --latched variable--.

Signed and Sealed this

Third Day of December, 1996

*Attest:*

BRUCE LEHMAN

*Attesting Officer*      *Commissioner of Patents and Trademarks*